Feb. 27, 1962    J. E. MORROW ET AL    3,022,973
SUPPORT DEVICE
Filed July 22, 1958
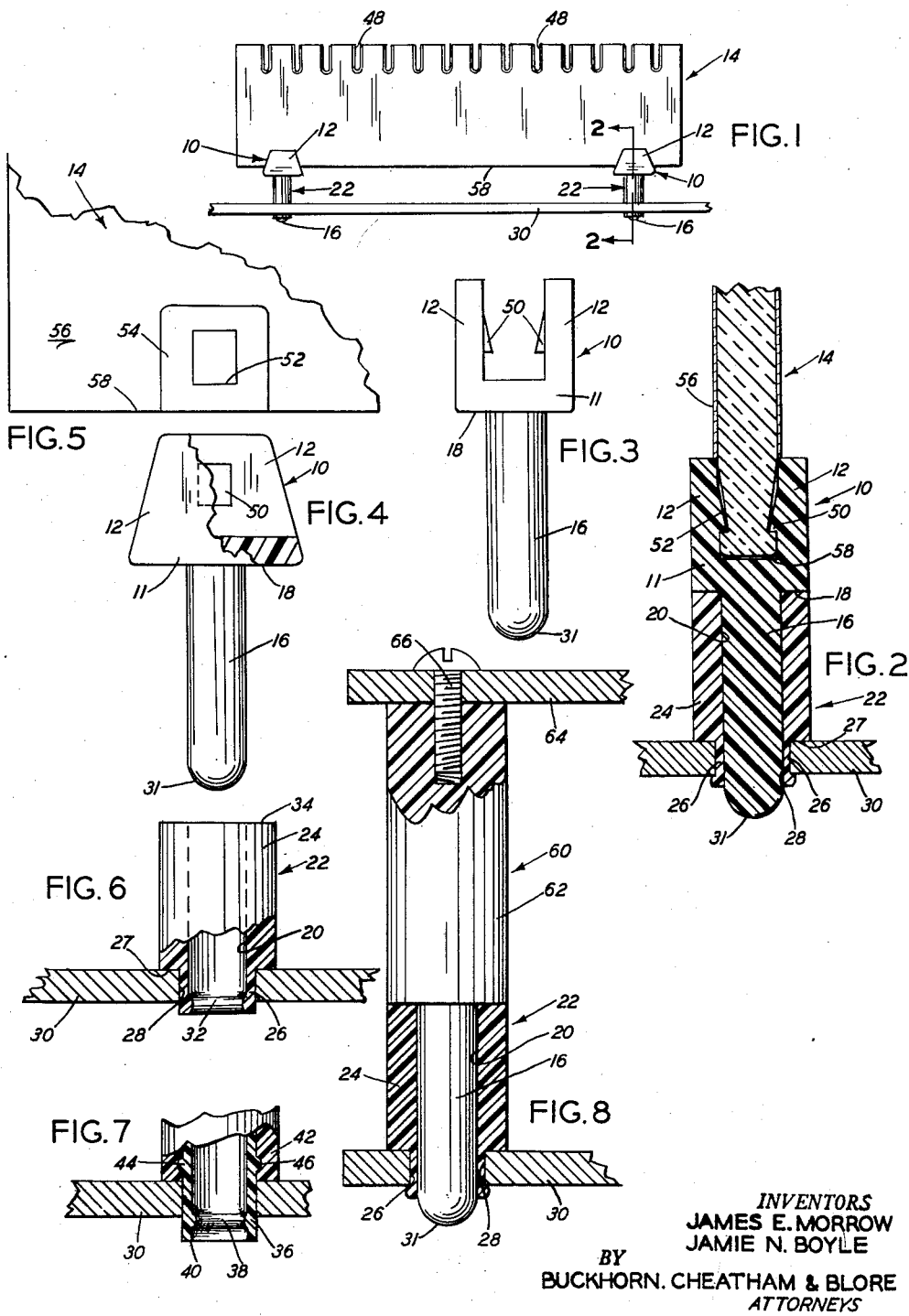
INVENTORS
JAMES E. MORROW
JAMIE N. BOYLE
BY
BUCKHORN, CHEATHAM & BLORE
ATTORNEYS 3,022,973
SUPPORT DEVICE
James E. Morrow and Jamie N. Boyle, Portland, Oreg., assignors to Tektronix, Inc., Portland, Oreg., a corporation of Oregon
Filed July 22, 1958, Ser. No. 750,175
1 Claim. (Cl. 248—223)

This invention relates to a support device and more particularly to a device which can be secured to a panel for supporting or attaching to the panel any desired element or member.

The device of the present invention is particularly suitable for supporting terminal strips or posts, or supporting sub-panels and similar elements on panels in electronic apparatus such as oscilloscopes, signal generators, radio test apparatus, computers, radio transmitters and receivers, etc., although the support devices of the present invention may be employed wherever it is desired to support any desired object on a panel or attach such object thereto. The support device of the present invention is simple in structure and can be rapidly and effectively locked in position on a panel by insertion of a fastening element projecting from the body portion of a fastening member into an aperture in a panel and then inserting a pin carried by a support member into and through a hole or bore extending through the fastening member including the fastening element to expand the fastening element and lock it in the aperture. The fastening element comprises a thin elastic or resilient continuous annular wall extending from a surface of the body of the fastening member so as to surround the bore referred to. The fastening element is provided with an internal annular shoulder which constricts the bore at a position spaced from the body of the fastening member. Insertion of a correctly sized pin elastically expands the annular wall referred to on the other side of the panel from the body portion of the fastening member. Such annular wall is preferably fabricated from an elastic or resilient moldable organic plastic material, a preferred material being nylon, although other suitable moldable organic plastic materials are available commercially.

It is therefore an object of the invention to provide an improved support device for attachment to a panel.

Another object of the invention is to provide a support device in which a pin forming part of the support member is employed to resiliently expand an annular wall of elastc material so as to lock such annular wall within an aperture in a panel.

A further object of the invention is to provide a two-part support device in which a fastening element in the form of a thin continuous annular wall of elastic organic plastic material projects from a fastening member and is expanded to lock such fastening element in an aperture in a panel by the insertion of a pin projecting from and forming part of a support member.

Other objects and advantages of the invention will appear in the following detailed description of the preferred embodiments of the invention as shown in the attached drawing of which:

FIG. 1 is a side elevation of a terminal strip structure employing a pair of the support devices of the present invention to fasten such terminal strip to a panel;

FIG. 2 is a fragmentary vertical section on an enlarged scale taken on the line 2—2 of FIG. 1 showing one of the support devices in vertical transverse section;

FIG. 3 is an end elevation of the support member of the support device of FIGS. 1 and 2;

FIG. 4 is a side elevation with parts broken away of the support member of FIGS. 2 and 3;

FIG. 5 is a partial side elevation on an enlarged scale of the terminal strip of FIG. 1 showing the portion thereof received in the upper portion of a support member;

FIG. 6 is a side elevation with portion thereof broken away showing the structure of a fastening member in accordance with the present invention and also showing a portion of a panel in vertical section;

FIG. 7 is a fragmentary side elevation with parts broken away showing a modified fastening member in position in a panel; and FIG. 8 is a side elevation of a modified type of support member with the part thereof broken away and also showing panel members and a fastening member in vertical section.

Referring more particularly to the drawings, the support member 10 of FIGS. 1 to 4 includes a support element 11 made up of a pair of upwardly extending clamping portions 12 providing a slot therebetween for receiving the lower portion of a terminal strip 14. The support member 10 also includes a pin 16 projecting from the lower surface 18 of the support element. As shown in FIG. 2, the pin 16 is adapted to be received in a bore 20 in a fastening member 22 which has a body portion 24, preferably of cylindrical formation, with the bore 20 extending axially therethrough. A fastening element 26 in the form of a thin annular wall surrounding the bore 20 projects from one surface of the body portion to provide a shoulder 27. The fastening element is adapted to be received in and fit an aperture 28 in a panel member 30 and is of sufficient length to extend entirely through the panel 30 and at least a short distance past the opposite surface of the panel. The fastening element 26 has an internal annular ridge or shoulder 32 spaced from the shoulder 27 of the body portion 24 by approximately the thickness of the panel 30, with which the fastening element 22 is to be employed. The pin 16 of the support member is of sufficient length to pass entirely through the body portion 24 of the fastening member and preferably has a rounded lower end 31. When the surface 18 of the support element 11 engages the surface 34 of the fastening member, the pin 16 projects through the constricted portion of the bore 20 provided by the internal annular ridge 32 so as to expand the lower end of the fastening element 26 into the form shown in FIG. 2. This securely locks the fastening member 22 to the panel 30.

The fastening member 22 is preferably of the integral structure shown in which the fastening element 26 is of the same material as the body portion 24. The material employed to form such fastening member is preferably an elastic molded organic material. A particularly suitable material is a polyamide or nylon but there are other moldable organic materials which have the required strength and resiliency providing physical properties similar to that of nylon. That is to say, such materials are sufficiently elastic that the fastening element may be deformed from a form shown in FIG. 6 to that shown in FIG. 2 without rupturing or splitting the thin elastic annular wall provided by the fastening element and will return to substantially its original position upon release of the deforming force. Examples of other materials are polyethylene or other polyethenic materials, such as polyvinyl chloride or copolymers of vinyl chloride and vinyl acetate as well as arcilic polymers, such as polymethacrylate. Such polymers will usually require the incorporation of plasticizers and stabilizers to develop the required properties as is well known in the art. That is to say, it is the physical properties of the organic plastic material which is of importance rather than its chemical composition. In any event, the material should have substantial tensile strength and be sufficiently elastic so that it will not be ruptured when a thin wall thereof is expanded by the pin 16 and so that it will return substantially to its original position upon removal of the pin.

With nylon or other materials having similar physical properties, there is sufficient frictional resistance to removal of the pin of the support member from the bore in the fastening member that it is extremely difficult to pull such pin from the fastening member. By employing a pin having a chamfered or rounded end and allowing the pin to project a slight distacne through the fastening element, it is possible to push the pin partially out of the fastening element until it clears the constricted portion of the bore therein, after which the pin may be easily pulled from the fastening member.

Although the preferred construction is to position the internal shoulder 32 of FIG. 6 immediately adjacent the end of the fastening element 26 spaced from the body portion 24 of the fastening member, it is possible to construct a fastening element 36 of the modified form shown in FIG. 7 in which an internal annular shoulder 38 is spaced from the end 40 of the fastening element so that such end 40 provides a reinforcement below the portion of the fastening element which is expanded by the pin 16. While the fastening element of the fastening member is preferably integral with the body portion thereof as shown in FIG. 6, it is also possible for the fastening element, such as the fastening element 36 of FIG. 7, to be a separate element, for example, a thin tubular element molded in situ within a body element 42 and secured therein in any desired manner, for example, by an interfitting projection 44 engaging in an internal annular groove 46 in the body element 42. Where a separate fastening element 36 is employed, the body portion 42 may be of any desired material, such as metal.

The support element 11 of the supporting member 10 of the fastening device of FIGS. 1 to 4 is, as indicated above, particularly adapted for receiving and supporting a terminal strip 14. The terminal strip 14 may be of any suitable insulating material but the one illustrated is of glazed ceramic material having a plurality of notches 48 in its upper edge. The notches have a laminated metallic lining, the exposed layer of which is a soft solder covering layer of or other metal having a higher melting point than solder and adhered to the surface of the ceramic matelial within the notches. This provides for soldering of wires or circuit component leads in the notches.

The upstanding clamping portions 12 of the support member 10 perferably are provided with inwardly and downwardly directed locking lugs 50 adapted to engage in and fit notches 52 on opposite sides of the lower portion of the terminal strip 14. As shown most clearly in FIG. 2, the locking portions 50 securely retain the terminal strip 14 in position. As shown in FIG. 5, the notches 52 can be in an area 54 of the surface of the terminal strip 14 which is free from glaze 56. Such areas 54 may be employed for supporting the terminal strip during application and firing of the glaze. Preferably, the lower corners 58 of the terminal strip 14, as more clearly shown in FIG. 2, are slightly rounded so that forcing the lower edge of the terminal strip downwardly between the clamping portions 12 of the support element will resiliently spread the clamping portions 12 apart without damage to the locking portions 50. The clamping portions 12 resiliently return to their normal position shown in FIG. 2 to securely hold the terminal strip 14 in position.

A modified type of support member 60 is shown in FIG. 8 to illustrate that the support devices of the present invention may be employed for supporting members other than terminal strips. The support portion 62 of the support member of FIG. 8 may have an elongated cylindrical body portion 62 which can be employed in conjunction with the fastening member 22 as an insulating support post. Any desired element to be supported, such as a subpanel 64, may be secured to the upper end of the support members 60 in a suitable manner, for example, by a screw 66. The fastening member 22 of FIG. 8 may be identical with the fastening member 22 of FIGS. 1, 2 and 6, or may obviously be a modified type shown in FIG. 7.

In the operation of the support device of the present invention should be clear from the above description. A fastening member, such as the member 22 of FIGS. 1, 2 and 6, is first installed with its shoulder 27 against the surface of a panel 30 and with the fastening element 26 thereof extending through an aperture 28 in the panel. The fastening element 26 should snugly fit in the aperture 28. A support member, such as the support member 10 of FIGS. 1 to 4, may then be installed by merely inserting the pin 16 in the bore 20 and pushing the support member 10 into position so that the surface 18 of its body portion engages the surface 34 of the fastening member 22. The pin engages the internal ridge 32 of the tubular fastening element and expands the end of such fastening element on the side of the panel opposite the body portion of the fastening member. The material of the fastening element is selected so as to be sufficiently elastic when formed into a thin wall that it can be expanded radially outwardly without splitting or otherwise rupturing the wall of the fastening element. This locks the entire support device rigidly in position. The resiliently deformed annular wall of the fastening element tightly grips the end of the pin 16 so that it is difficult to pull the pin out of the fastening member 22 by tension applied to the support element of the fastening member. However, by allowing the pin 16 to project a short distance from the end of the fastening element, and also by forming a rounded or chamfered end on the pin, a relatively slight pressure against the ends of the pin will move the pin sufficient to release the locking action after which the pin may be easily withdrawn from the locking member. This releases the fastening element of the fastening member so that the fastening member can likewise be removed from the panel 30.

While we have disclosed the preferred embodiments of our invention, it is understood that the details thereof may be varied and that the scope of the invention is to be determined by the following claim.

We claim:

A support device comprising a fastening member having a body portion and a thin walled tubular fastening sleeve element extending from said body portion for insertion through an aperture in a panel, said fastening member having a pin receiving hole extending through said body portion and axially through said sleeve element to provide a wall around said hole, a support member having a support portion and a pin extending from said support portion for insertion in said hole, said sleeve prior to insertion of said pin in said hole having an internal shoulder spaced axially of said hole from said body portion and providing a constriction of said hole, said sleeve element having an inner wall surface extending parallel to the axis of said hole from within said body portion to said shoulder and having an outer wall surface parallel to said inner wall surface, said sleeve element having a wall thickness less than the wall thickness of said body portion and forming a continuous elastic annular wall around said constricted portion of said hole and an external shoulder between said body portion and said sleeve element, said pin when inserted in said hole having its outer surface fitting said inner wall surface and extending parallel to said inner wall surface through said constricted portion of said hole to deform said sleeve element outwardly adjacent said shoulder and on the opposite side of said panel from said body portion, said support portion having a pair of opposed resilient holding elements spaced from each other to provide a slot for receiving a member to be supported, said holding elements having downwardly directed lugs in said slot for holding said member to be supported in said slot.

(References on following page)

References Cited in the file of this patent

UNITED STATES PATENTS

| | | |
|---|---|---|
| 1,697,317 | Kyle | Jan. 1, 1929 |
| 2,314,770 | Cogswell | Mar. 23, 1943 |
| 2,467,251 | Bowman | Apr. 12, 1949 |
| 2,592,130 | Erb et al. | Apr. 8, 1952 |
| 2,664,458 | Rapata | Dec. 29, 1953 |
| 2,872,655 | Damon | Feb. 3, 1959 |
| 2,876,485 | Cowles | Mar. 10, 1959 |

FOREIGN PATENTS

| | | |
|---|---|---|
| 735,069 | Great Britain | Aug. 10, 1955 |
| 795,597 | Great Britain | May 28, 1958 |